United States Patent
Anglin et al.

(10) Patent No.: US 8,874,532 B2
(45) Date of Patent: *Oct. 28, 2014

(54) MANAGING DEREFERENCED CHUNKS IN A DEDUPLICATION SYSTEM

(71) Applicant: International Business Machines Corporation, Armonk, NY (US)

(72) Inventors: Matthew J. Anglin, Tucson, AZ (US); David M. Cannon, Tucson, AZ (US); Colin S. Dawson, Tucson, AZ (US); Robert S. Elder, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,637

(22) Filed: Oct. 23, 2013

(65) Prior Publication Data

US 2014/0052952 A1 Feb. 20, 2014

Related U.S. Application Data

(63) Continuation of application No. 13/477,908, filed on May 22, 2012, which is a continuation of application No. 13/221,646, filed on Aug. 30, 2011, now abandoned.

(51) Int. Cl.
*G06F 17/00* (2006.01)
*G06F 17/30* (2006.01)
*G06F 3/06* (2006.01)

(52) U.S. Cl.
CPC .......... *G06F 3/0641* (2013.01); *G06F 17/3015* (2013.01); *G06F 3/0673* (2013.01); *G06F 3/0608* (2013.01)
USPC ......................................................... 707/693

(58) Field of Classification Search
USPC ................. 707/672, 673, 679, 681, 683, 698; 711/159, 161, 162
See application file for complete search history.

(56) References Cited

U.S. PATENT DOCUMENTS

| | | | |
|---|---|---|---|
| 7,426,139 | B2 | 9/2008 | Ho et al. |
| 2003/0009477 | A1 | 1/2003 | Wilding et al. |
| 2007/0250674 | A1 | 10/2007 | Fineberg et al. |
| 2008/0243879 | A1* | 10/2008 | Gokhale et al. ............... 707/100 |
| 2009/0313248 | A1 | 12/2009 | Balachandran et al. |
| 2009/0327625 | A1 | 12/2009 | Jaquete et al. |
| 2010/0274772 | A1 | 10/2010 | Samuels |

OTHER PUBLICATIONS

Mark Lillibridge et al., Sparse Indexing: Large Scale, Inline Deduplication Using Sampling and Locality, 2009, USENIX Association, 111-123.*

(Continued)

*Primary Examiner* — Jean B Fleurantin
(74) *Attorney, Agent, or Firm* — David W. Victor; Konrad, Raynes, Davda and Victor LLP

(57) ABSTRACT

A chunk index has information on chunks in a storage space referenced in objects in the storage space. The chunk index includes a reference count for each chunk indicating a number of objects in which the chunk is referenced and a reference measurement representing a level of data object references to the chunk. One chunk is selected to remove from the storage space based on a criteria applied to the reference measurements of chunks having reference counts indicating that the chunks are not referenced in one object in the storage space.

20 Claims, 11 Drawing Sheets

(56) References Cited

OTHER PUBLICATIONS

P. Mell, "THe NIST Definition of Cloud Computing (Draft)", National Institute of Standards and Technology, Special Publication 800-145 (draft), Jan. 2011, pp. 1-7.

U.S. Appl. No. 13/221,646, filed Aug. 30, 2011, entitled, "Managing Dereferenced Chunks in a Deduplication System", invented by Matthew J. Anglin et al., pp. 1-41.

U.S. Appl. No. 13/477,908, filed May 22, 2012, entitled, "Managing Dereferenced Chunks in a Deduplication System", invented by Matthew J. Anglin et al., pp. 1-41.

Preliminary Amendment, dated May 22, 2012, for U.S. Appl. No. 13/221,646, filed Aug. 30, 2011, entitled, "Managing Dereferenced Chunks in a Deduplication System". invented by Matthew J. Anglin et al., pp. 1-7.

Office Action, dated Jan. 16, 2013, for U.S. Appl. No. 13/221,646, filed Aug. 30, 2011, entitled, "Managing Dereferenced Chunks in a Deduplication System", invented by Matthew J. Anglin et al., pp. 1-20. (37.264).

Response to Office Action, dated Apr. 16, 2013, for U.S. Appl. No. 13/221,646, filed Aug. 30, 2011, entitled, "Managing Dereferenced Chunks in a Deduplication System", invented by Matthew J. Anglin et al., pp. 1-9.

Notice of Allowance, dated Jul. 15, 2013, for U.S. Appl. No. 13/221,646, filed Aug. 30, 2011, entitled, "Managing Dereferenced Chunks in a Deduplication System", invented by Matthew J. Anglin et al., pp. 1-17.

Office Action, dated Jan. 17, 2013, for U.S. Appl. No. 13/477,908, filed May 22, 2012, entitled, "Managing Dereferenced Chunks in a Deduplication System", invented by Matthew J. Anglin et al., pp. 1-15.

Response to Office Action, dated Apr. 16, 2013, for U.S. Appl. No. 13/477,908, filed May 22, 2012, entitled, "Managing Dereferenced Chunks in a Deduplication System", invented by Matthew J. Anglin et al., pp. 1-7.

Notice of Allowance, dated Jul. 8, 2013, for U.S. Appl. No. 13/477,908, filed May 22, 2012, entitled, "Managing Dereferenced Chunks in a Deduplication System", invented by Matthew J. Anglin et al., pp. 1-15.

Thwel, T. et al., "An Efficient Indexing Mechanism for Data Deduplication" dated 2009, University of Computer Sciences Yangon, pp. 1-5.

* cited by examiner

MANAGING DEREFERENCED CHUNKS IN A DEDUPLICATION SYSTEM

CROSS-REFERENCE TO RELATED APPLICATION

This application is a continuation of U.S. patent application Ser. No. 13/477,908, filed on May 22, 2012, which is a continuation of U.S. patent application Ser. No. 13/221,646, filed Aug. 30, 2011, which applications are incorporated herein by reference in their entirety.

BACKGROUND OF THE INVENTION

1. Field of the Invention

The present invention relates to a computer program product, system, and method for managing dereferenced chunks in a deduplication system.

2. Description of the Related Art

Data deduplication is a data compression technique for eliminating redundant data to improve storage utilization. Deduplication reduces the required storage capacity because only one copy of a unique data unit, also known as a chunk or extent, is stored. Disk based storage systems, such as a storage management server or Virtual Tape Library (VTL), may implement deduplication technology to detect redundant data chunks, and reduce duplication by avoiding redundant storage of such chunks.

A deduplication system operates by dividing a file into a series of chunks, or extents. The deduplication system determines whether any of the chunks are already stored, and then proceeds to only store those non-redundant chunks. Redundancy may be checked with chunks in the file being stored or chunks already stored in the system.

An object may be divided into chunks using a fingerprinting technique such as Karp-Rabin fingerprinting. Redundant chunks are detected using a hash function, such as MD5 (Message-Digest Algorithm 5) or SHA-1 (Secure Hash Algorithm 1), on each chunk to produce a hash value for the chunks and then compare those hash values against hash values of chunks already stored on the system. Typically the hash values for stored chunks are maintained in an index (deduplication index). A chunk may be uniquely identified by a hash value, or digest, and a chunk size. The hash of a chunk being considered is looked-up in the deduplication index. If an entry is found for that hash value and size, then a redundant chunk is identified, and that chunk in the object can be replaced with a pointer to the matching chunk maintained in storage.

In a client-server software system, the deduplication can be performed at the data source (client), target (server) or on a deduplication appliance connected to the server. The ability to deduplicate data at the source or at the target offers flexibility in respect to resource utilization and policy management. There are also tradeoffs in use of source-side versus target-side deduplication. For example, source-side deduplication can conserve network bandwidth, but may also require deployment of special agent software to each source. Further, deduplication may be performed between multiple servers such that a source server sends data extents to the target server only if those extents are not already stored at the target server.

SUMMARY

A chunk index has information on chunks in a storage space referenced in objects in the storage space. The chunk index includes a reference count for each chunk indicating a number of objects in which the chunk is referenced and a reference measurement representing a level of data object references to the chunk. One chunk is selected to remove from the storage space based on a criteria applied to the reference measurements of chunks having reference counts indicating that the chunks are not referenced in one object in the storage space.

DETAILED DESCRIPTION

Described embodiments provide techniques to determine dereferenced chunks in a deduplication system, which are chunks which are not referenced in an object, to remove from a storage space. The deduplication component may maintain one or more reference measurements representing a level of data object references to the chunks. One or more criteria may be applied to these reference measurements to determine dereferenced chunks to remove from storage. Chunks having a relatively lower degree of object references are removed because a higher level of object references indicates that the dereferenced chunk is more likely to be referenced in the future. Retaining dereferenced chunks more likely to be referenced in the storage reduces the need to retransmit those dereferenced chunks when subsequently referenced in a data object.

The described embodiments minimize usage of transmission and storage bandwidth by reducing the number of times chunks that were previously dereferenced need to be resent to storage when later added to a data object because the dereferenced chunks are retained in storage as long as practicably possible. Further, the described embodiments minimize Input/Output operations by avoiding the need to re-create deduplication index entries for dereferenced chunks later added to a data object, because the index entries for the dereferenced chunks remain until the dereferenced chunk is removed from the storage.

Figure 1:
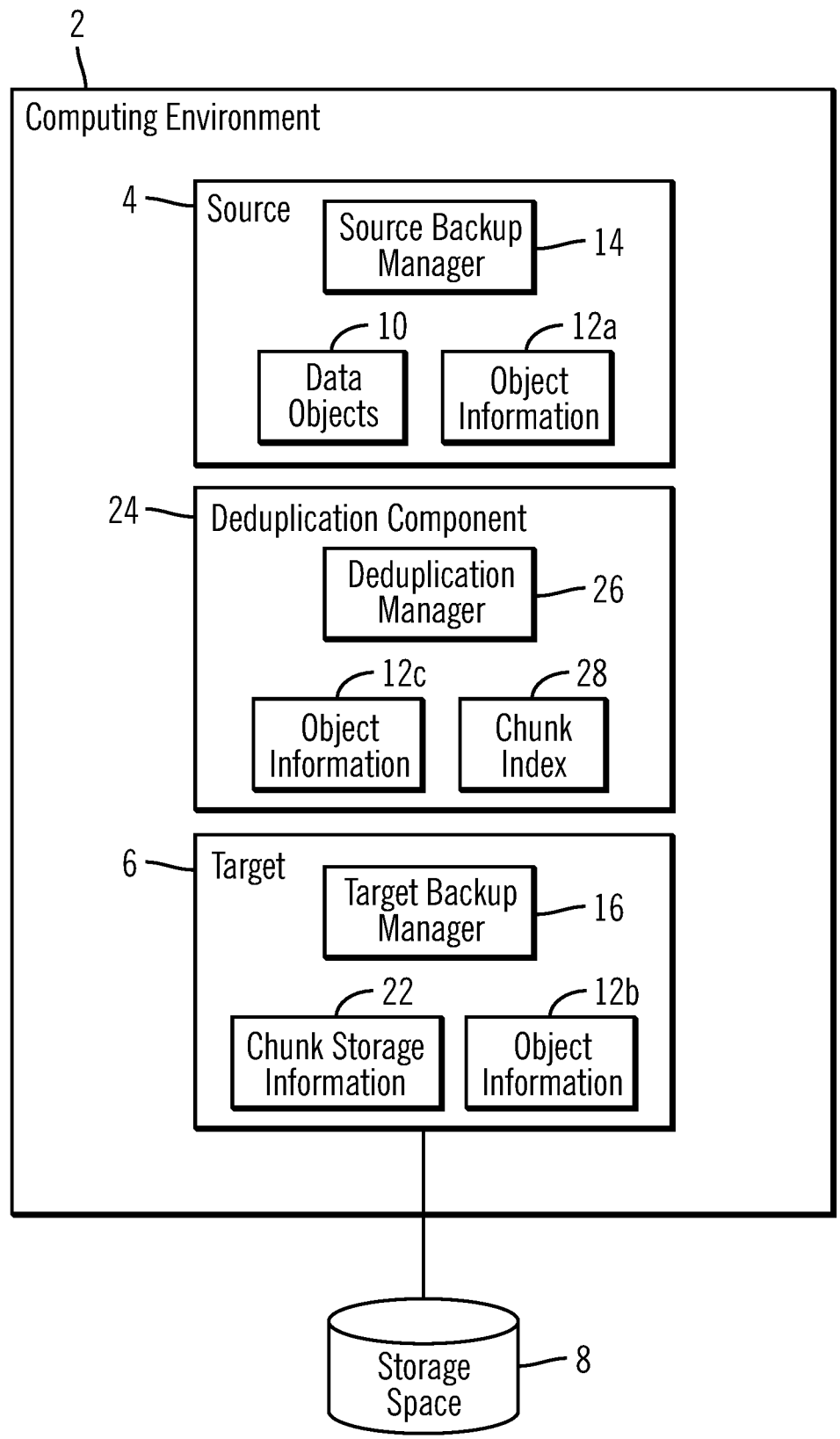
FIG. 1 illustrates a computing environment in which embodiments are implemented.

FIG. 1 illustrates an embodiment of a computing environment 2 having a source 4 and target 6 for backing up data objects at the source 4 to a storage space 8. The source 4 maintains data objects 10, such as files or objects, and maintains object information 12a having metadata for each data object 10, including an ordered list of chunks of data assigned to each object. The source 4 may store data objects 10 in local storage at the source 4. To back up data objects 10 at the source 4, a source backup manager 14 transfers non-redundant chunks in the data objects 10 to back up to a target backup manager 16 in the target 6. The source 4 may transfer data objects 10 to the target 6 as part of a backup operation or other operations, such as archive, hierarchical storage management (HSM), replication or other storage management procedures.

In an alternative embodiment, the source 4 may not maintain object information 12, and the tracking of chunks may be performed at the deduplication component 24 and/or target 6.

The target backup manager 16 maintains object information 12b on chunks assigned to data objects provided from one or more sources 4, which may include information on objects 10 at the source 4 and additional source systems. The target 6 further includes chunk storage information 22 indicating locations in the storage space 8 where chunks of the data objects 10 are located.

A deduplication component 24 provides deduplication services for the source 4 and target 6 backing-up data objects 10 to the storage space 8. The deduplication component 24 includes a deduplication manager 26 to perform deduplication operations and a chunk index 28, such as a deduplication index, providing information on chunks 28 that have been assigned to objects 10. The deduplication manager 26 ensures that only one copy of each chunk is maintained in the storage space 8, although one chunk may be included in multiple data objects. The deduplication manager 26 may also maintain object information 12c, having information on the assignment of chunks to objects 10 in the source 4 and other source 4 systems.

To perform deduplication, upon having a new or unchanged chunk in a data object, the source backup manager 14 may calculate a hash for the chunk and then communicate the hash for the chunk to the deduplication manager 26 to determine whether the chunk index 28 has a matching hash. If not, the deduplication manager 26 notifies the source backup manager 14 that the chunk is new, and the source backup manager 14 sends a full copy of the new or changed chunk in the data object 10 to store in storage space 8. Otherwise, if the chunk index 28 has a matching copy of the hash, then the source backup manager 14 need not transfer a full copy of the chunk. Instead, the source backup manager 14 may transfer the digest for the chunk and its location in the object. Alternatively, the target backup manager 16 may interact with the deduplication component 24 to determine whether it needs to send a chunk to the storage space 8.

In a client-side deduplication embodiment, the source 4, i.e., client, communicates with the deduplication manager 26 to determine whether chunks need to be sent to the target 6, so that only new chunks not already indicated in the chunk index 28 are sent to the target 6. In a server-side deduplication embodiment, the source 4 sends all the chunks of the data object 10 to back up to the target 6, and the target backup manager 16 requests the deduplication component 24 to determine which chunks are new chunks that need to be stored in the storage space 8. In a server-to-server replication embodiment, the source server (such as the source 4) would communicate with the deduplication manager 26 to determine chunks that need to be sent to a target server 6.

The source 4, target 6 and deduplication component 24 may be implemented in separate computer devices that communicate over a network, such as a local area network (LAN), storage area network (SAN), wide area network (WAN), etc. In further embodiments, the source 4, target 6, and/or deduplication components 24 may be implemented on one or two computer systems. If the source 4, target 6, and/or deduplication component 24 are in the same system, then they may communicate over a bus or via memory.

The storage space 8 may be configured in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The source backup manager 14, target backup manager 16, and deduplication manager 26 may comprise software programs in a memory executed by a processor. In an alternative embodiment, some portion or all of the programs 14 and 16 may be implemented in a hardware component, such as a dedicated integrated circuit, e.g., Application Specific Integrated Circuit (ASIC), expansion card, etc.

Although the source backup manager 14, target backup manager 16, and deduplication manager 26 are shown as separate components, in alternative implementations the functions performed by these components 14, 16, and 26 may be implemented in a single program component in a single computer system or in more than two program components in more than two computer devices. For instance, the deduplication component 24 may be implemented at the source 4 or the target 6, or part of the source backup manager 14 or target backup manager 16 components.

Figure 2:
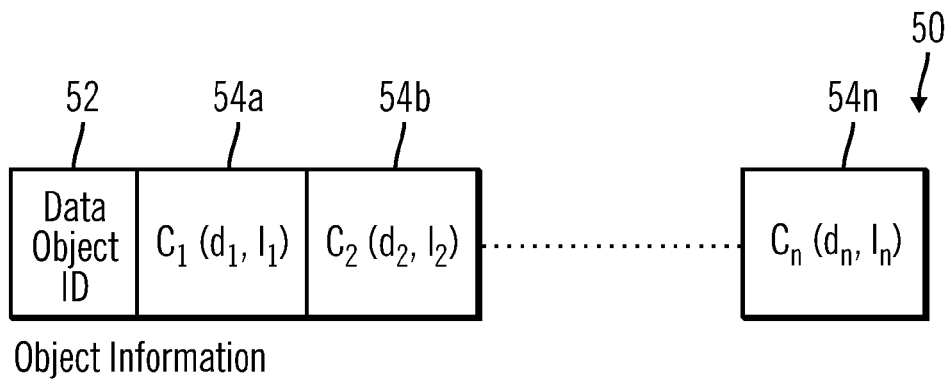
FIG. 2 illustrates an embodiment of object information.

FIG. 2 illustrates an embodiment of object information 50 for one object maintained in the object information 12a, 12b, 12c. The object information 50 for one object includes an identifier (ID) 52 of the object, and identification information for one or more chunks 54a, 54b . . . 54n of data assigned to the object 52. The object information 50 may maintain an ordered list of the references to chunks $(C_1 \ldots C_n)$ indicating the order 1 . . . n in which the chunks appear in the data object. For each chunk $(C_i)$, the object information 50 maintains a digest $(d_i)$ of the chunk and a length $(l_i)$ of the chunk. In this way, the object information 50 provides a reference to the chunks included in the data object, such as digest and length, but not the actual data. The digest (d) may be calculated by processing the chunk to generate a unique value for the chunk. For instance, in one embodiment, the digest may comprise a cryptographic digest, such as MD5 (Message-Digest Algorithm 5) or SHA-1 (Secure Hash Algorithm 1), which calculates cryptographic hashes of each chunk in the data object.

Figure 3:
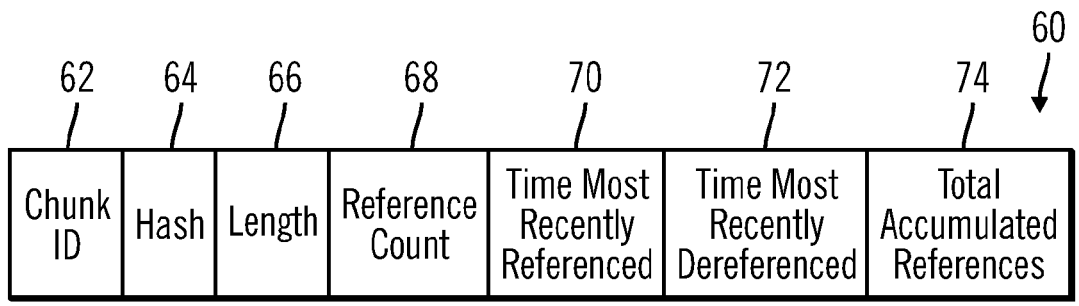
FIG. 3 illustrates an embodiment of a chunk index entry.

FIG. 3 illustrates an embodiment of a deduplication index entry 60 maintained by the target backup manager 16 for each chunk stored in the storage 8. The index entry 60 includes a chunk identifier (ID) 62 of the chunk in storage 8, a hash value 64 computed from the chunk represented by the chunk ID and a length 66 of the chunk. When determining whether to transmit a full copy of the chunk to the target backup manager 16, the source backup manager 14 may provide the hash and length of the chunk to the target backup manager 16, and the target backup manager 16 may determine whether one entry 60 in the chunk index 28 has a hash value 64 and length 66 matching those sent by the source backup manager 14 to determine whether the source 14 needs to transmit the full chunk or just an identifier of the chunk, e.g., the digest and length.

The chunk index entry 60 further includes a reference count 68 indicating a number of data objects 10 currently referencing the chunk 62 identified by the hash 64 and length 66; a time most recently referenced 70 indicating a last time the chunk was included as a reference in one object 10; a time most recently dereferenced 72 indicating a time the reference count 68 was set to a value indicating the chunk is not referenced in any object, i.e., the time the chunk was removed as a reference from the last data object 10 having a reference to the chunk; and a total accumulated references 74 indicating a total number of times the chunk has been added as a reference to a data object 52.

The chunk index entry may include one or more of the values 70, 72, and 74. The values 70, 72, and 74 each provide a different representation or indication of a level of data object references to the chunk or the degree to which that chunk is added as a reference to data objects. For instance, a chunk having a more current time most recently referenced 70 is likely to be more frequently referenced in a data object because it was the more recently referenced item. A chunk having an oldest time most recently dereferenced 72 is less likely to be added as a reference to objects 10 than other chunks having a more recent time most recently dereferenced 72 because a chunk that has been dereferenced the longest is less likely to be subject to an additional reference. Further a chunk having a greater number of total accumulated references 74 is more likely to be referenced again under the assumption that more frequently referenced items have a greater chance of being selected than those less frequently referenced.

Figure 4:
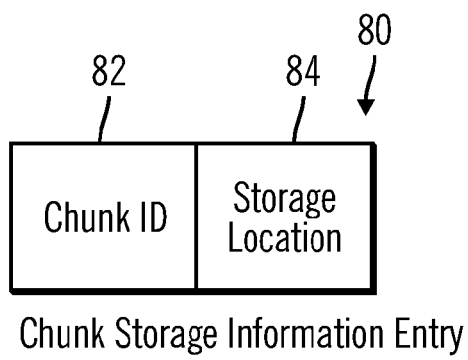
FIG. 4 illustrates an embodiment of a chunk storage information entry.

FIG. 4 illustrates an embodiment of a chunk storage entry 80 the target backup program 16 maintains in the chunk storage information 22 for each chunk maintained in storage 8. The chunk storage entry 80 includes a chunk ID 82 and a storage location 84 in the storage 8 of the identified chunk 82, such as a logical or physical address, identifying where the chunk is stored. The chunk storage information 22 maintains only one copy of each unique chunk.

In this way, the subcomponents of a data object, referred to herein as chunks, are stored separately from the objects in which they are included. A chunk may comprise an extent of tracks, a block of data or any other definable subunit of data that may be assigned to an object. These chunks may have fixed or variable length. An object may comprise any grouping of data units, such as a file, object, database, etc.

Figure 5:
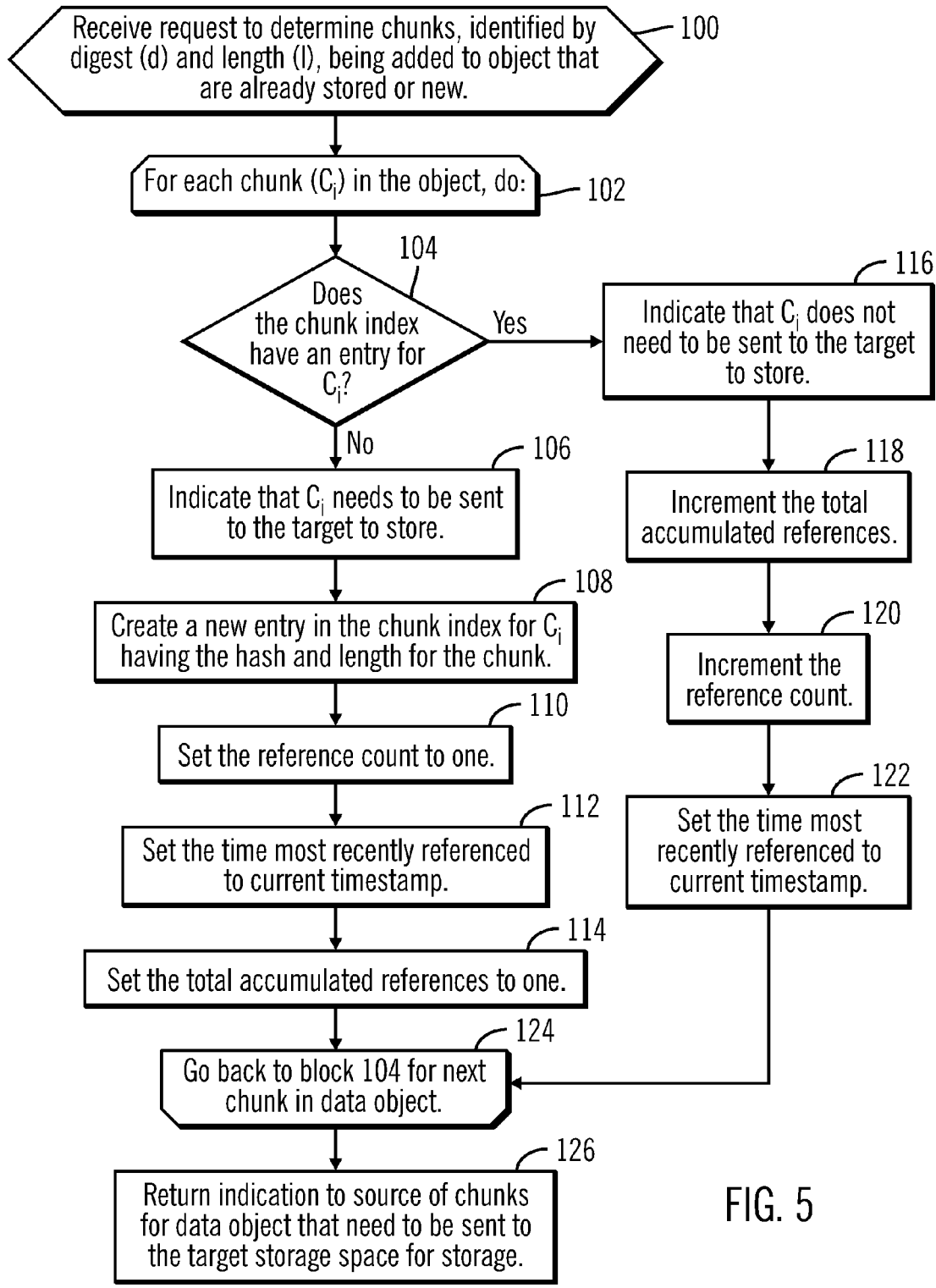
FIG. 5 illustrates an embodiment of operations to process chunks in an object to determine chunks to transmit to storage.

FIG. 5 illustrates an embodiment of operations performed by the deduplication manager 26 to determine which chunks being added to objects comprise already existing chunks in the storage space 8 or are new chunks. The source 14 or target backup manager 16 may provide the deduplication manager 26 the digest (d) and length (l) of each chunk 54a . . . 54n in the data object to determine which chunks are new chunks not currently in the storage space 8. This will allow the source 14 or target 16 backup manager to only send new chunks to the storage space 8. As discussed, the deduplication may be handled at the source or target side, depending on whether client side or server side deduplication is implemented. At block 100, the deduplication manager 26 receives a request to determine chunks, identified by digest (d) and length (l), being added to an object 10 that are already stored or new. The object for which the chunk information is provided may comprise a new object the source 4 is storing or a modified object the source 4 wants to back up.

For each chunk ($C_i$) in the object to consider, the deduplication manager 26 performs a loop of operations at blocks 102 through 124. The deduplication manager 26 determines (at block 104) whether the chunk index 28 has an entry 60 (FIG. 3) for $C_i$, such as by determining whether there is an entry having a hash 64 and length 66 matching the hash and length provided for $C_i$ with the request. If the chunk index 28 does not have an entry for $C_i$, then the deduplication manager 16 indicates (at block 106) that $C_i$ does need to be sent to the target 6 to store. A new entry 60 (FIG. 3) is created (at block 108) in the chunk index 28 for $C_i$ having the hash 64 and length 66 provided in the request. The reference count 68 is set (at block 110) to one, and the time most recently referenced 70 is set (at block 112) to a current timestamp of the system. The total accumulated references 74 is set (at block 114) to one.

If (at block 104) the chunk index 28 already has an entry for $C_i$, then the deduplication manager 26 indicates (at block 116) that Ci does not need to be sent to the target 6 to store. The total accumulated references 74 is incremented (at block 118), the reference count 68 is incremented (at block 120), and the time most recently referenced 70 is set (at block 122) to the current timestamp of the system. From blocks 114 or 122, control proceeds (at block 124) to process a next chunk indicated in the request. After considering all chunks indicated in the request, the deduplication manager 26 returns indication to the source 14 or target 16 backup manager of those chunks for the data object that need to be sent to the target storage space 8 for storage and those that do not need to be sent because they are already stored in the storage space 8.

Figure 6:
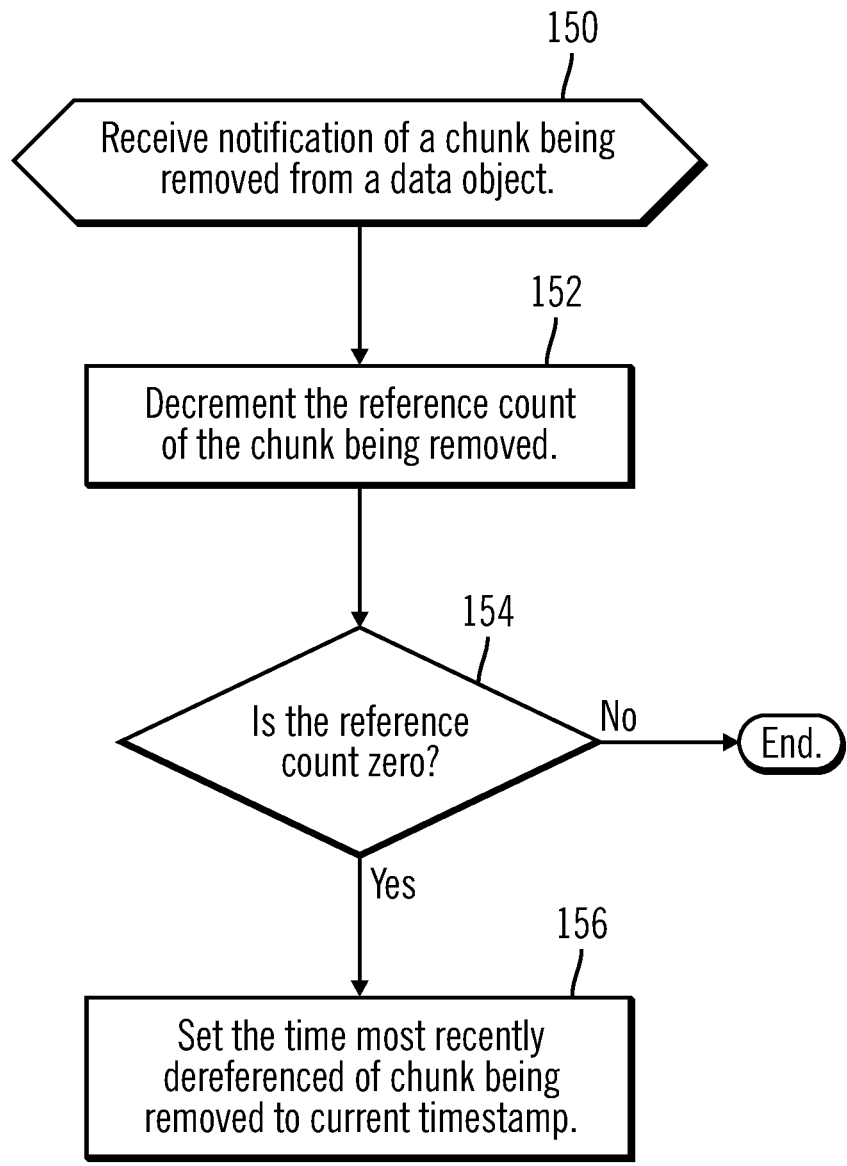
FIG. 6 illustrates an embodiment of operations to perform when a chunk is removed from a data object.

FIG. 6 illustrates an embodiment of operations performed by the deduplication manager 26 upon receiving notification from the target backup manager 16 or the source backup manager 14 of a chunk being removed from a data object. Although the operations are described with respect to a single chunk, the operations may apply to multiple chunks or may be performed multiple times to apply to multiple chunks. The deduplication component 24 may be notified of all chunks in a data object 10 if the entire data object is being removed or migrated to another storage space, or the chunks are being deleted from a data object that is still maintained by the source 4. Upon receiving (at block 150) notification of a chunk being removed, the deduplication manager 26 decrements (at block 152) the reference count 68 for the chunk. If (at block 154) the reference count 68 is zero, indicating that the chunk is not referenced in any data object, then the deduplication manager 26 sets the time most recently dereferenced 72 of the chunk being removed to a current timestamp in the system, such as determined by a system clock.

Figure 7:
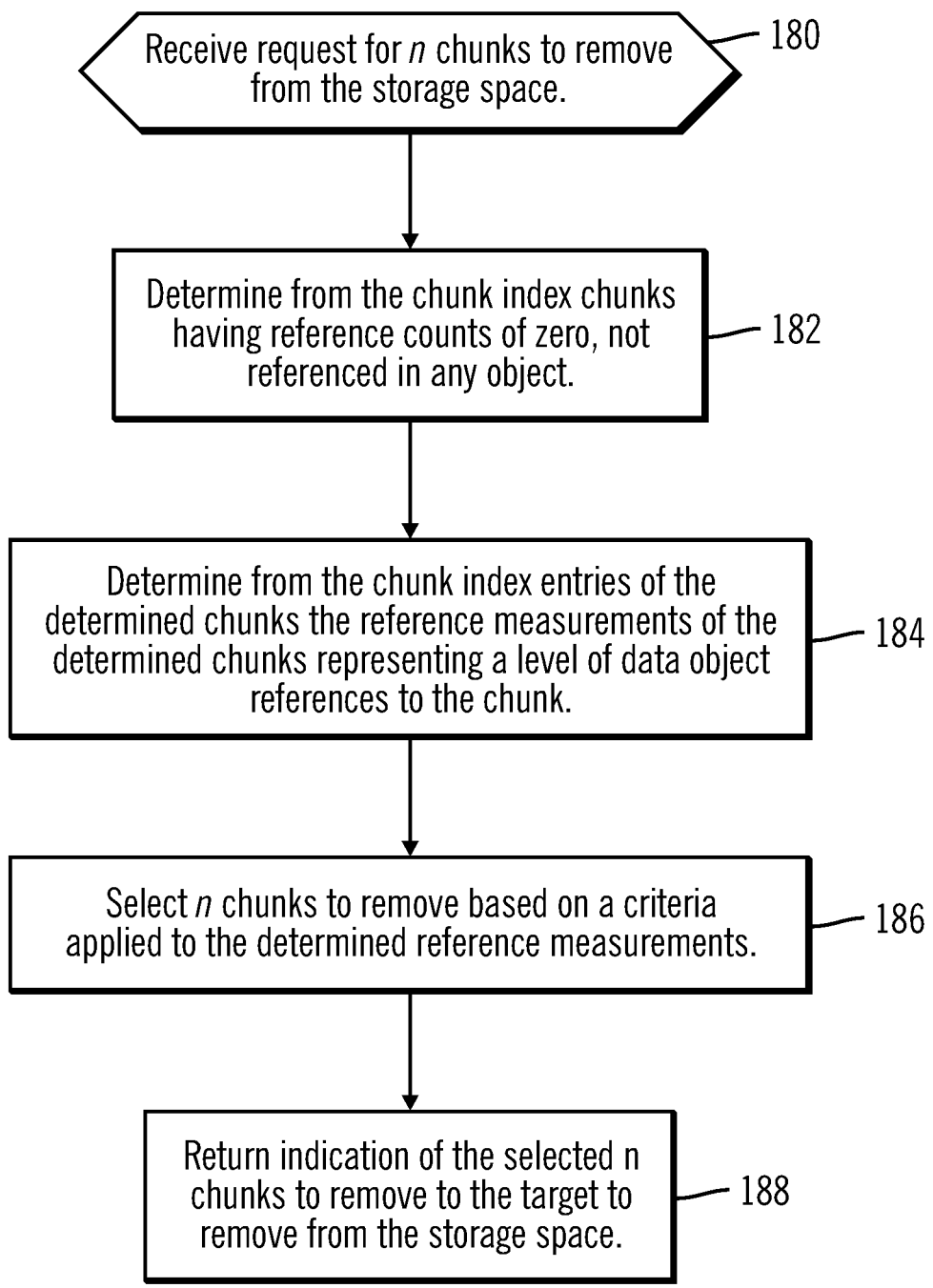
FIG. 7 illustrates an embodiment of operations to determine chunks to remove from storage.

FIG. 7 illustrates an embodiment of operations performed by the deduplication manager 26 to process a request to determine chunks that are not being referenced to remove from the storage space 8. The target backup manager 16 may determine to remove dereferenced chunks from the storage space 8 to free space to make available for further referenced chunks. In such case, the target backup manager 16 may request the deduplication component 24 to determine which dereferenced chunks to remove. The chunks may have a fixed length or a variable length. In a variable chunk length embodiment, the request may be to deallocate a specified amount of space, and the number of chunks selected to remove to make space may depend on the size of the variable (or fixed) length chunks. Upon receiving (at block 180) a request for n chunks to remove from the storage space 8, the deduplication manager 26 determines (at block 182) from the chunk index 28 chunks having reference counts 68 of zero, i.e., not referenced in any object 10. The deduplication manager 26 determines (at block 184) from the chunk index 28 entries 60 of the determined chunks having reference measurements representing a level of data object references to the chunk, such as time most recently referenced 70, time most recently dereferenced 72, and total accumulated references 74. The deduplication manager 26 then selects (at block 186) n chunks to remove based on a criteria applied to the determined reference measurements. The deduplication manager 26 returns (at block 188) to the target backup manager 16 indication of the selected n chunks to remove from the storage space 8.

Figure 8:
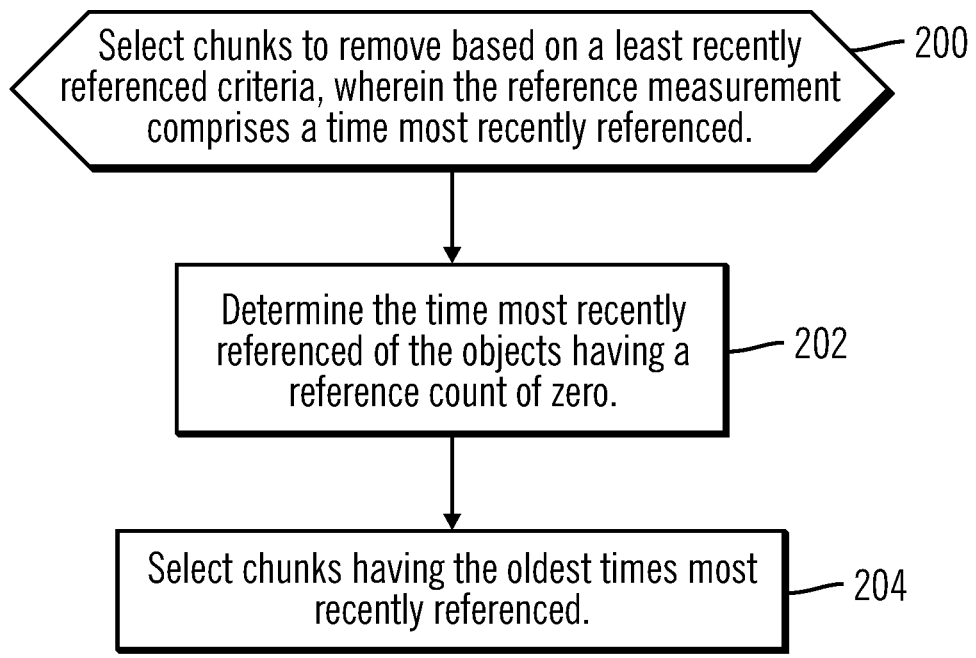
FIG. 8 illustrates an embodiment of operations to select chunks to remove based on a least recently referenced criteria.

FIGS. 8, 9, 10, and 11 provide embodiments of different criteria the deduplication manager 16 may apply to determine chunks to remove. FIG. 8 illustrates an embodiment of a least recently referenced criteria to determine dereferenced chunks to remove based on a reference measurement comprising the time most recently referenced 70 value. To select dereferenced chunks to remove (at block 200), the deduplication manager 26 determines (at block 202) the time most recently referenced 70 of chunks having a reference count 68 of zero, indicating they are dereferenced chunks not referenced in one object. Dereferenced chunks having the oldest time most recently referenced 70 are selected (at block 204).

Figure 9:
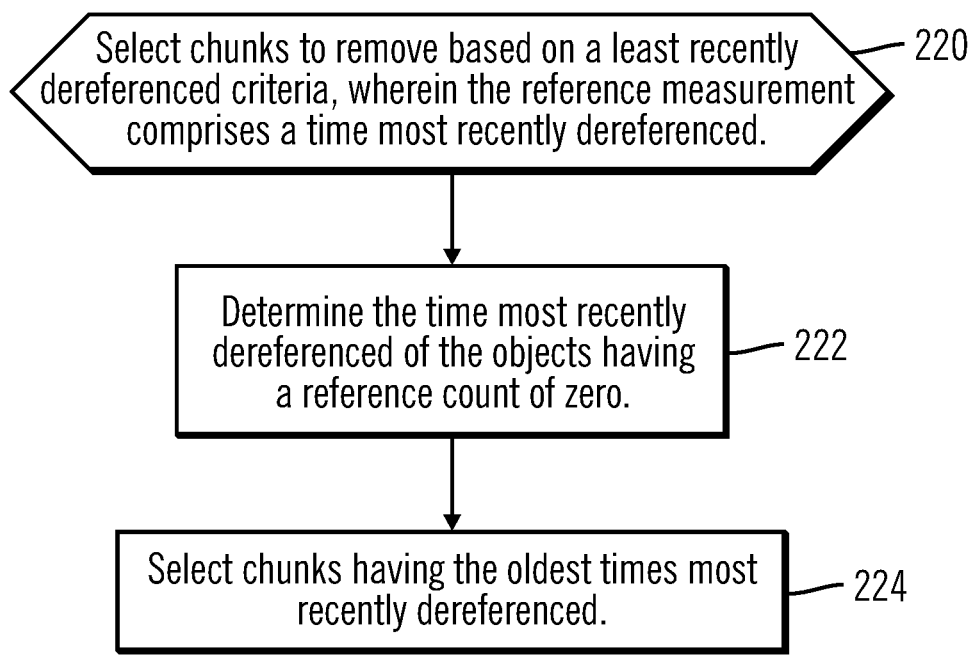
FIG. 9 illustrates an embodiment of operations to select chunks to remove based on a least recently dereferenced criteria.

FIG. 9 illustrates an embodiment of a least recently dereferenced criteria to determine dereferenced chunks to remove based on a reference measurement comprising the time most recently dereferenced 72 value. To select dereferenced chunks to remove (at block 220), the deduplication manager 26 determines (at block 222) the time most recently dereferenced 72 values of chunks having a reference count 68 of zero. Dereferenced chunks having the oldest time most recently dereferenced 70 are selected (at block 224) for removal from the storage space 8.

Figure 10:
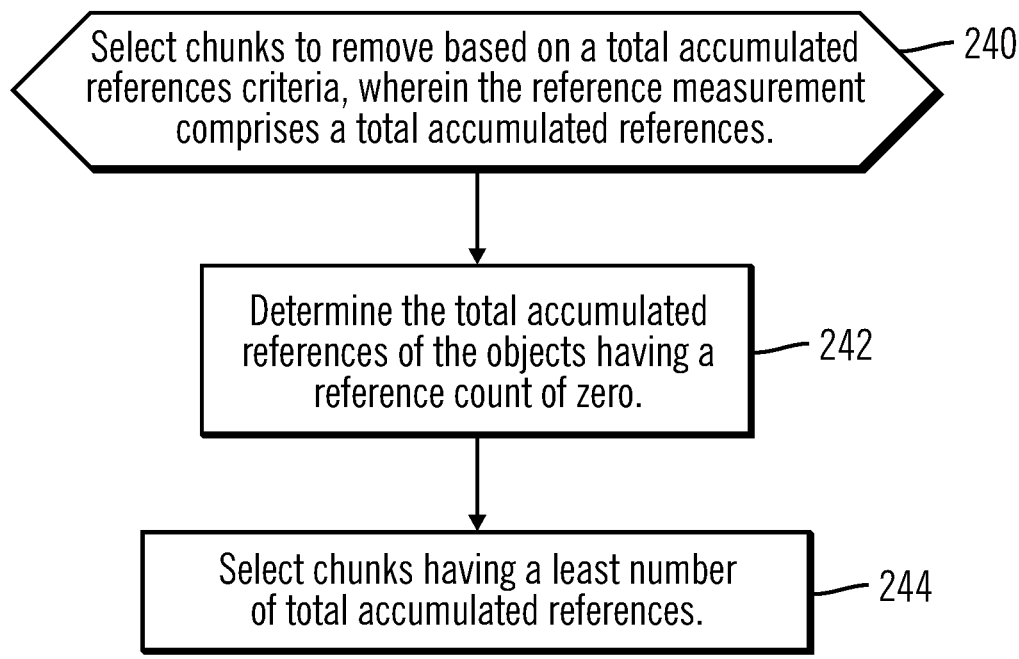
FIG. 10 illustrates an embodiment of operations to select chunks to remove based on a total accumulated references criteria.

FIG. 10 illustrates an embodiment of a total accumulated references criteria to determine dereferenced chunks to remove based on a reference measurement comprising the total accumulated references 74 the chunk has received. To select dereferenced chunks to remove (at block 240), the deduplication manager 26 determines (at block 242) the total accumulated references 74 of objects having a reference count 68 of zero, indicating they are dereferenced chunks not referenced in one object. Dereferenced chunks having the least number of total accumulated references 74 are selected (at block 244) for removal from the storage space 8.

Figure 11:
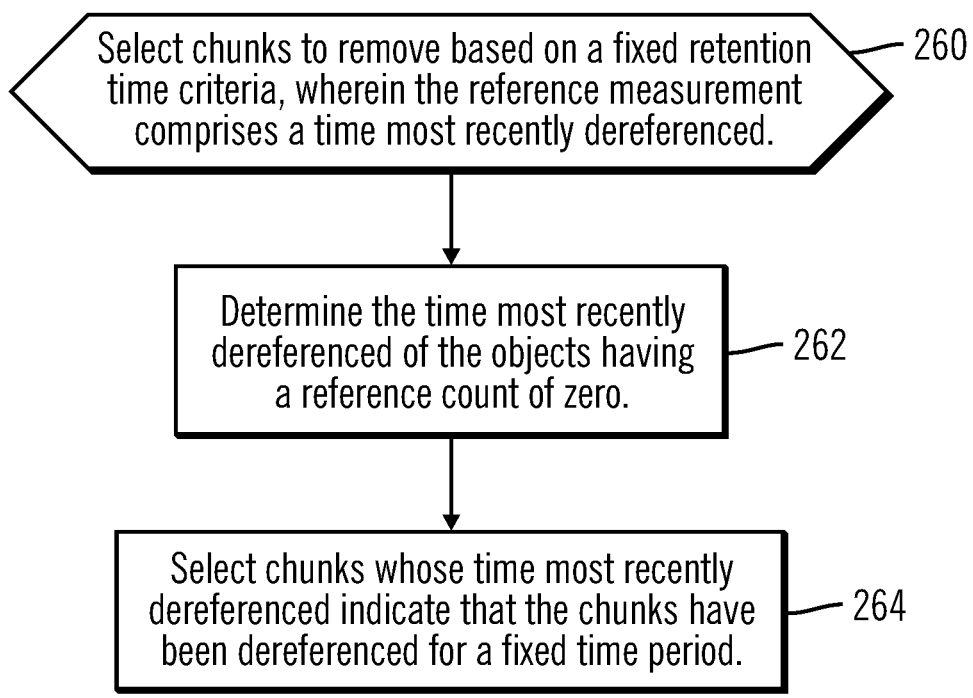
FIG. 11 illustrates an embodiment of operations to select chunks to remove based on a fixed retention time.

FIG. 11 illustrates an embodiment of a fixed retention time criteria to determine dereferenced chunks to remove based on a reference measurement comprising the time most recently dereferenced 72. To select dereferenced chunks to remove (at block 260), the deduplication manager 26 determines (at block 262) the time most recently dereferenced 72 of chunks having a reference count 68 of zero. Dereferenced chunks whose time most recently dereferenced 72 indicate that the chunks have been dereferenced for at least a fixed time period are selected (at block 264) for removal from the storage space 8. The deduplication manager 26 may compare the time most recently dereferenced 72 of the dereferenced chunks to the current time to determine if the fixed period of time has elapsed since the chunk became dereferenced.

Figure 12:
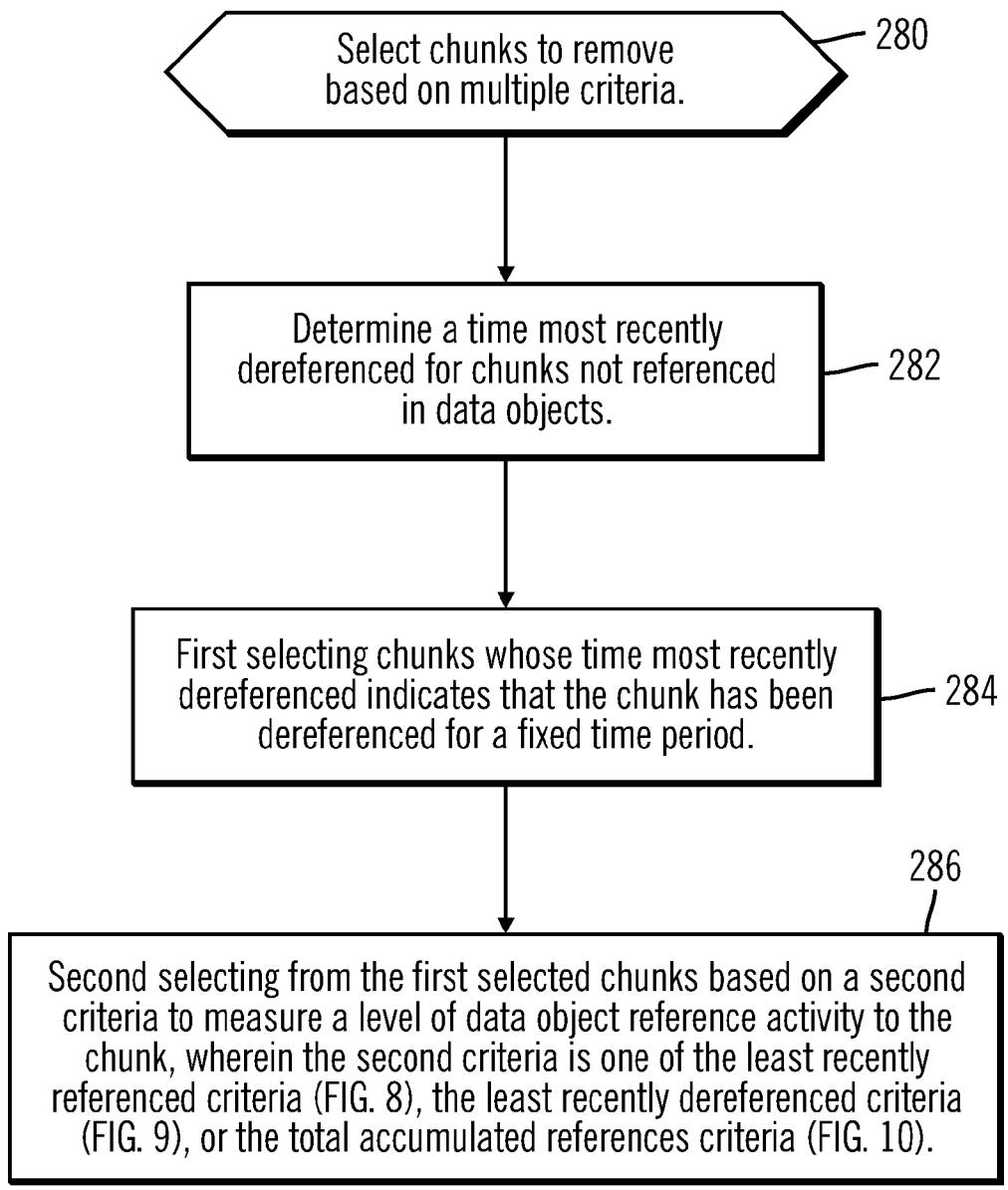
FIG. 12 illustrates an embodiment of operations to select chunks to remove based on multiple criteria.

FIG. 12 illustrates an embodiment of operations performed by the deduplication manager 26 to select chunks to remove based on multiple selection criteria, where the multiple criteria utilize criteria applied to different measurements of the level of data object reference activity. Upon initiating the operation (at block 280) to select dereferenced chunks to remove from the storage space 8 based on multiple criteria, the deduplication manager 26 determines (at block 282) the time most recently dereferenced 72 for chunks not referenced in data objects. The deduplication manager may first use the fixed retention time criteria to first select (at block 284) chunks whose time most recently dereferenced 72 indicates that the chunk has been dereferenced for at least a fixed time period. The deduplication manager 26 then second selects (at block 286) from the first selected chunks based on a second criteria to measure a level of data object reference activity to the chunk. The second criteria may comprise one of the least recently referenced criteria (FIG. 8), the least recently dereferenced criteria (FIG. 9), or the total accumulated references criteria (FIG. 10). Additional criteria may be used that measure the level of reference activity to predict whether a dereferenced chunk will be selected again to select from the first selected chunks. Further, the first criteria used to first select chunks may comprise a criteria different from the fixed retention time criteria, such as the criteria of FIGS. 8, 9, 10 or another criteria that measures a level of reference activity to the chunks in data objects.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 13-15. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
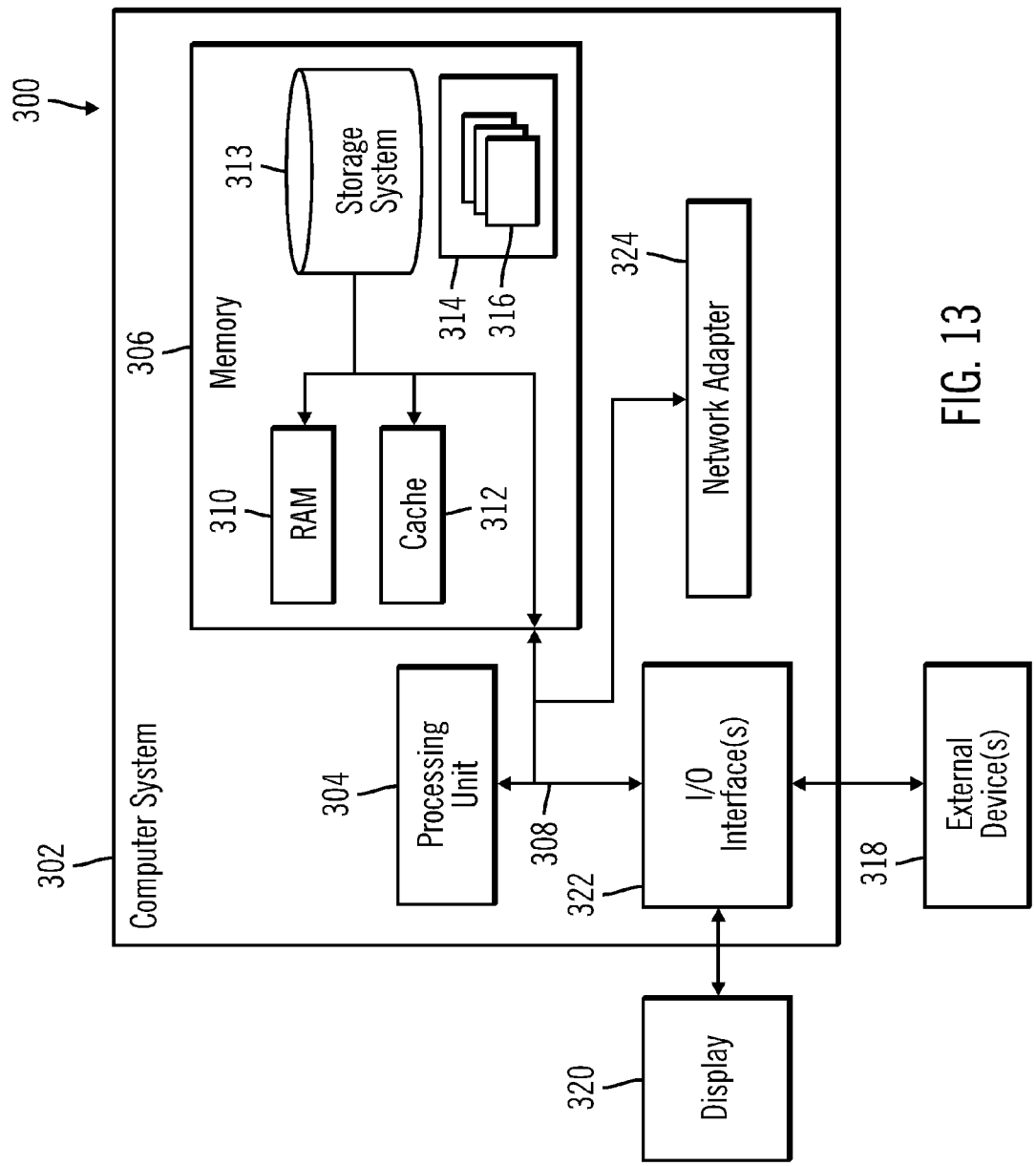
FIG. 13 illustrates an implementation of a node in the network computing embodiment.

FIG. 13 illustrates an embodiment of a cloud computing node 300 which may comprise an implementation of the source 4, target 6, and deduplication 24 components. systems, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 14:
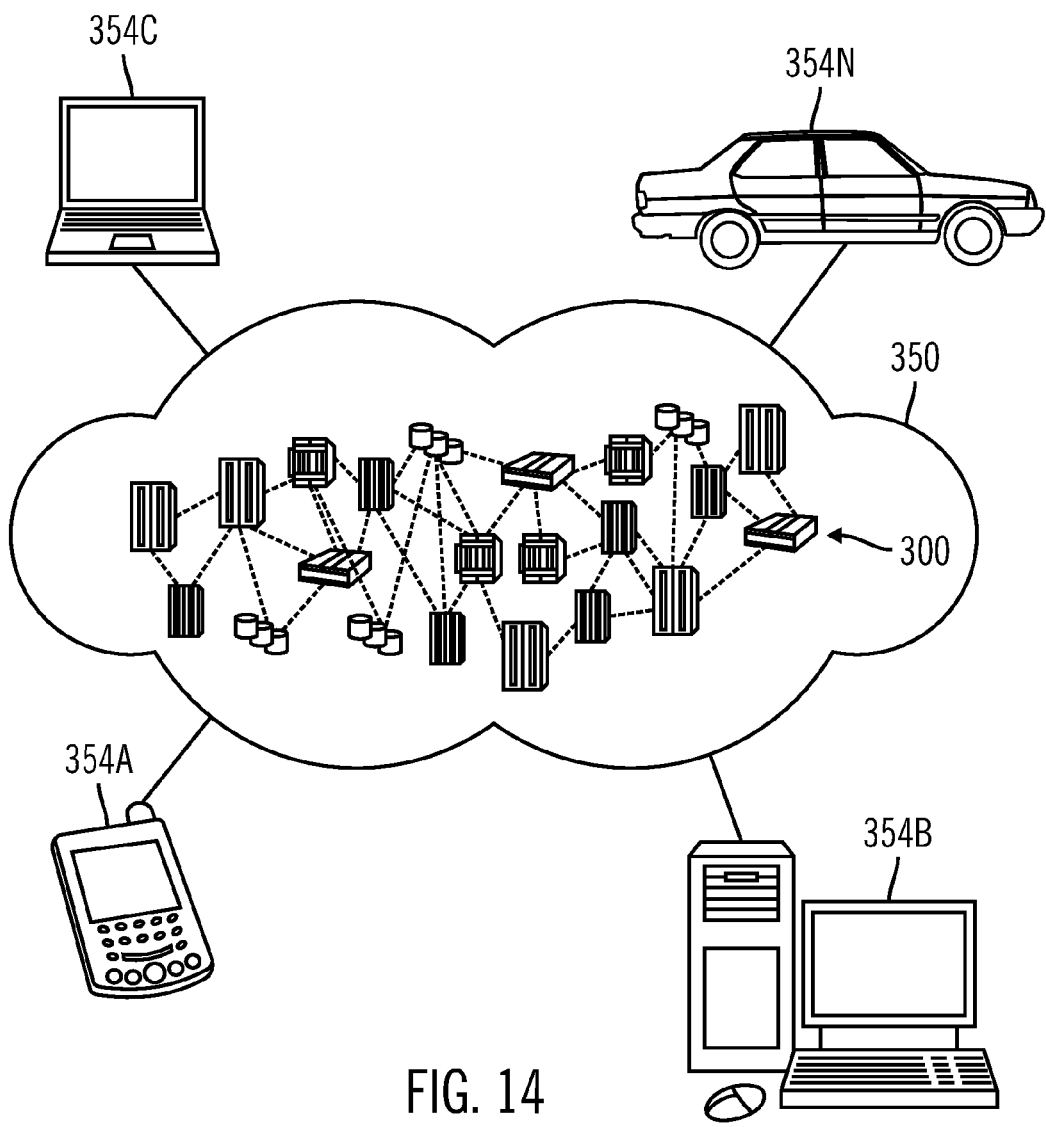
FIG. 14 illustrates an embodiment of a cloud computing environment.

Referring now to FIG. 14, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 13 are intended to be illustrative only and that computing nodes 300 and cloud computing environment 350 can communicate with any type of computerized device over any type of network and/or network addressable connection (e.g., using a web browser).

Figure 15:
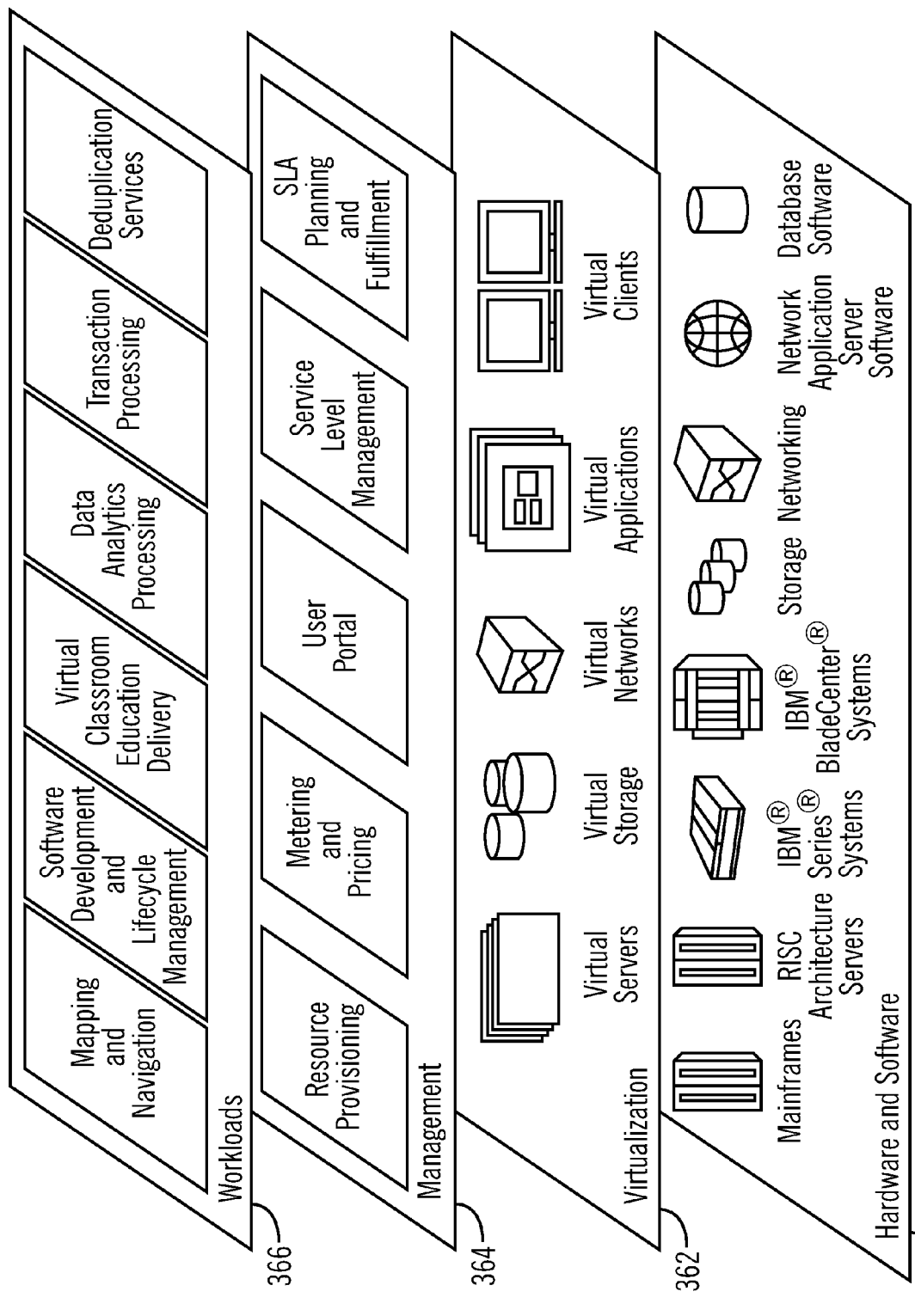
FIG. 15 illustrates an embodiment of abstraction model layers of a cloud computing environment.

Referring now to FIG. 15, a set of functional abstraction layers provided by cloud computing environment 350 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the deduplication services, such as described with respect to FIGS. 1-12, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining data objects in a storage space, the computer program product comprising a non-transitory computer readable storage medium having computer readable program code embodied therein that executes to perform operations, the operations comprising:

maintaining a chunk index having information on chunks in the storage space referenced in the data objects to provide deduplication of the chunks, wherein the chunk index includes a reference count for each chunk indicating a number of the data objects in which the chunk is referenced and a reference measurement representing a level of the data objects references to the chunk;

incrementing the reference count for one chunk in response to including a reference to the chunk in one of the data objects;

selecting one chunk to remove from the storage space based on a criteria applied to the reference measurements of chunks having reference counts indicating that the chunks are not referenced in one of the data objects in the storage space; and returning indication of the selected chunk to remove from the storage space.

2. The computer program product of claim 1, wherein the reference measurement of each chunk comprises a time the chunk was most recently referenced in one of the data objects, and wherein applying the criteria comprises selecting the chunk not referenced having the time that is oldest.

3. The computer program product of claim 1, wherein the reference measurement of each chunk comprises a time the reference count was set to a value indicating that the chunk is not referenced in one of the data objects, and wherein applying the criteria comprises selecting the chunk not referenced having the time that is oldest.

4. The computer program product of claim 1, wherein the reference measurement of each chunk comprises a total accumulated references indicating a number of times the chunk has been referenced in the data objects, and wherein applying the criteria comprises selecting the chunk not referenced having a least number of total accumulated references.

5. The computer program product of claim 1, wherein the reference measurement of each chunk comprises a time the reference count was set to a value indicating that the chunk is not referenced in one of the data objects, and wherein applying the criteria comprises selecting the chunk not referenced whose time indicates that the chunk has been dereferenced for a fixed time period.

6. The computer program product of claim 1, wherein selecting one chunk to remove from the storage space comprises:

first selecting chunks based on a first criteria applied to the reference measurements for the chunks not referenced in one of the data objects to measure a first level of data object reference activity to the chunk; and second selecting from the first selected chunks based on a second criteria to measure a second level of data object reference activity to the chunk, wherein the measurement of the first level of data object reference activity of the first criteria is different from the measurement of the second level of data object reference activity of the second criteria.

7. The computer program product of claim 1, wherein the storage space comprises a first storage space, and wherein the operations further comprise:

decrementing the reference count for one chunk in response to one of removing the chunk from one of the data objects, removing one of the data objects including the chunk, and migrating one of the data objects including the chunk to a second storage space.

8. A system for maintaining data objects in a storage space, comprising:

a non-transitory computer readable storage medium including a chunk index having information on chunks in the storage space referenced in data objects to provide deduplication of the chunks, wherein the chunk index includes a reference count for each chunk indicating a number of the data objects in which the chunk is referenced and a reference measurement representing a level of the data objects references to the chunk;

a processor executing code to perform operations comprising:

incrementing the reference count for one chunk in response to including a reference to the chunk in one of the data objects;

selecting one chunk to remove from the storage space based on a criteria applied to the reference measurements of chunks having reference counts indicating that the chunks are not referenced in one of the data objects in the storage space; and returning indication of the selected chunk to remove from the storage space.

9. The system of claim 8, wherein the reference measurement of each chunk comprises a time the chunk was most recently referenced in one of the data objects, and wherein applying the criteria comprises selecting the chunk not referenced having the time that is oldest.

10. The system of claim 8, wherein the reference measurement of each chunk comprises a time the reference count was set to a value indicating that the chunk is not referenced in one of the data objects, and wherein applying the criteria comprising selecting the chunk not referenced having the time that is oldest.

11. The system of claim 8, wherein the reference measurement of each chunk comprises a total accumulated references indicating a number of times the chunk has been referenced in one of the data objects, and wherein applying the criteria comprises selecting the chunk not referenced having a least number of total accumulated references.

12. The system of claim 8, wherein the reference measurement of each chunk comprises a time the reference count was set to a value indicating that the chunk is not referenced in one of the data objects, and wherein applying the criteria comprises selecting the chunk not referenced whose time indicates that the chunk has been dereferenced for a fixed time period.

13. The system of claim 8, wherein selecting one chunk to remove from the storage space comprises:

first selecting chunks based on a first criteria applied to the reference measurements for the chunks not referenced in one of the data objects to measure a first level of data object reference activity to the chunk;

second selecting from the first selected chunks based on a second criteria to measure a second level of data object reference activity to the chunk, wherein the measurement of the first level of data object reference activity of the first criteria is different from the measurement of the second level of data object reference activity of the second criteria.

14. The system of claim 8, wherein the storage space comprises a first storage space, and wherein the operations further comprise:

decrementing the reference count for one chunk in response to one of removing the chunk from one of the data objects, removing one of the data objects including the chunk, and migrating one of the data objects including the chunk to a second storage space.

15. A computer-implemented method for maintaining, by a processor, data objects in a storage space, comprising:

maintaining a chunk index having information on chunks in the storage space referenced in data objects to provide deduplication of the chunks, wherein the chunk index includes a reference count for each chunk indicating a number of the data objects in which the chunk is referenced and a reference measurement representing a level of the data objects references to the chunk;

incrementing the reference count for one chunk in response to including a reference to the chunk in one of the data objects;

selecting one chunk to remove from the storage space based on a criteria applied to the reference measurements of chunks having reference counts indicating that the chunks are not referenced in one of the data objects in the storage space; and returning indication of the selected chunk to remove from the storage space.

16. The method of claim 15, wherein the reference measurement of each chunk comprises a time the chunk was most recently referenced in one of the data objects, and wherein applying the criteria comprises selecting the chunk not referenced having the time that is oldest.

17. The method of claim 15, wherein the reference measurement of each chunk comprises a time the reference count was set to a value indicating that the chunk is not referenced in one of the data objects, and wherein applying the criteria comprising selecting the chunk not referenced having the time that is oldest.

18. The method of claim 15, wherein the reference measurement of each chunk comprises a total accumulated references indicating a number of times the chunk has been referenced in the data objects, and wherein applying the criteria comprises selecting the chunk not referenced having a least number of total accumulated references.

19. The method of claim 15, wherein the reference measurement of each chunk comprises a time the reference count was set to a value indicating that the chunk is not referenced in one of the data objects, and wherein applying the criteria comprises selecting the chunk not referenced whose time indicates that the chunk has been dereferenced for a fixed time period.

20. The method of claim 15, wherein selecting one chunk to remove from the storage space comprises:

first selecting chunks based on a first criteria applied to the reference measurements for the chunks not referenced in one data of the data objects to measure a first level of data object reference activity to the chunk; and second selecting from the first selected chunks based on a second criteria to measure a second level of data object reference activity to the chunk, wherein the measurement of the first level of data object reference activity of the first criteria is different from the measurement of the second level of data object reference activity of the second criteria.

* * * * *